J. Roussillon. Wine Basket.

No. 112852

Patented Mar 21 1871

Witnesses:
John Becker
S. S. Mabee

Inventor:
J. Roussillon
per Munn & Co.
Attorneys

United States Patent Office.

JEAN ROUSSILLON, OF EPERNAY, FRANCE.

Letters Patent No. 112,852, dated March 21, 1871.

IMPROVEMENT IN WINE-BASKETS.

The Schedule referred to in these Letters Patent and making part of the same.

*To all whom it may concern:*

Be it known that I, JEAN ROUSSILLON, of Epernay, in the Empire of France, have invented a new and useful Improvement in Wine-Basket; and I do hereby declare that the following is a full, clear, and exact description thereof, which will enable others skilled in the art to make and use the same, reference being had to the accompanying drawing forming part of this specification.

This invention relates to a new and useful improvement in willow baskets for holding and transporting bottles of wine and other articles, more especially intended as a pic-nic basket; and It consists in a basket made in two parts, hinged together, and each part divided into compartments, as hereinafter more fully described.

In the accompanying drawing—

Similar letters of reference indicate corresponding parts.

Figure 1:
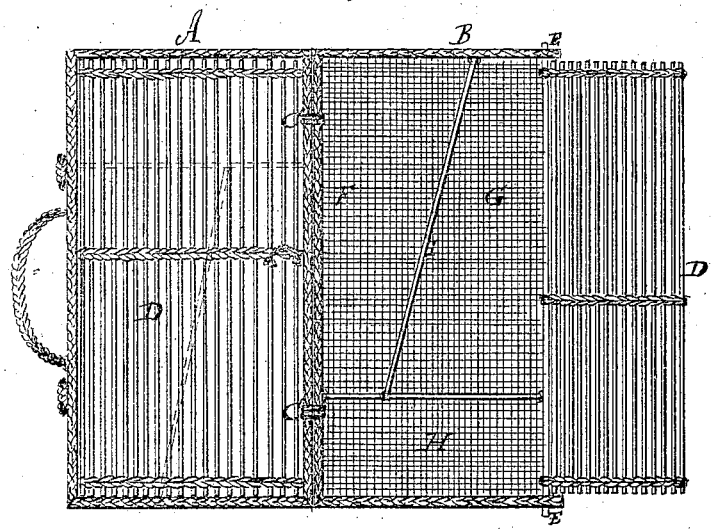
Figure 1 is a view of the basket open, with one of the parts closed and the cover of the other part thrown back, giving a view of the partitions.
Figure 2:
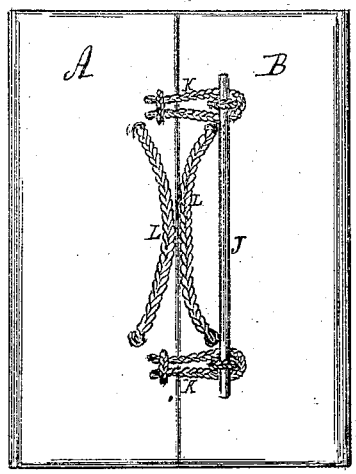
Figure 2 is a top view of the basket closed and fastened, as when being transported.

This basket is made of the osier willow, in two parts, A and B, connected together by willow hinges, as seen at C C.

Each part is provided with a cover, D, attached to the edge of the parts, as seen at E E.

Each part is divided into three compartments, F, G, and H. The compartments F and G are for wine bottles.

The partition I is so placed that the room is economized by reversing the neck of the bottles.

The compartments H are for sandwiches or other articles of diet suitable to be carried on pic-nics or similar occasions.

The two parts are fastened together by the rod J passing through willow staples over the willow hasps K K.

L L are the handles on the parts, by means of which the basket is carried, after the manner of carrying a valise.

This is a most convenient arrangement, and its advantages must be apparent to all.

Having thus described my invention,

I claim as new and desire to secure by Letters Patent—

A willow wine-basket, formed in two hinged parts A B, having covers D D and compartments F G H, all constructed and arranged as and for the purpose described.

The above specification of my invention signed by me this 10th day of January, 1870.

J. ROUSSILLON.

Witnesses:
A. G. GILL,
T. GRIFFIN.